(12) United States Patent
Suwald (10) Patent No.: US 10,482,306 B2
(45) Date of Patent: Nov. 19, 2019

(54) FINGERPRINT SENSING SYSTEM AND METHOD

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 271 days.

(21) Appl. No.: 15/642,272

(22) Filed: Jul. 5, 2017

(65) Prior Publication Data

US 2018/0012056 A1 Jan. 11, 2018

(30) Foreign Application Priority Data

Jul. 5, 2016 (EP) ..................................... 16177943

(51) Int. Cl.
*G06K 9/28* (2006.01)
*G06K 9/00* (2006.01)

(52) U.S. Cl.
CPC ....... *G06K 9/0002* (2013.01); *G06K 9/00087* (2013.01)

(58) Field of Classification Search
CPC ............. H03M 1/00–1/88; G06K 9/00; G06K 9/00013–9/0012; G06K 9/0002
See application file for complete search history.

(56) References Cited

U.S. PATENT DOCUMENTS

| | | | | |
|---|---|---|---|---|
| 8,041,083 B2 * | 10/2011 | Pai | ........................ | G06K 9/0002 324/672 |
| 2013/0177220 A1 * | 7/2013 | Erhart | ................... | G06K 9/0002 382/124 |
| 2015/0074156 A1 * | 3/2015 | Degani | ..................... | G06F 5/00 708/204 |
| 2017/0220849 A1 * | 8/2017 | Tan | ....................... | G06K 9/0002 |
| 2018/0174013 A1 * | 6/2018 | Lee | .................. | G06K 19/07707 |

FOREIGN PATENT DOCUMENTS

EP 2 403 146 A1 1/2012

OTHER PUBLICATIONS

Chuang et al., "Low-Cost Logarithmic CMOS Image Sensing by Nonlinear Analog-To-Digital Conversion", IEEE Transactions on Consumer Electronics, vol. 51, No. 4, November 2005, pp. 1212-1217. (Year: 2005).*

Sandner et al., "A 6bit, 1.2GSps Low-Power Flash-ADC in 0.13μm Digital CMOS", Proceedings of the Design, Automation and Test in Europe Conference and Exhibition (DATE'05), IEEE Computer Society, 4 pages total. (Year: 2005).*

(Continued)

*Primary Examiner* — Brian Werner (57) ABSTRACT

According to a first aspect of the present disclosure, a fingerprint sensing system is provided, comprising: a sensing unit configured to measure a physical property of a sensing cell and to produce a voltage in dependence on said physical property; and an analog-to-digital converter configured to convert said voltage into a digital signal, wherein said analog-to-digital converter implements a non-linear conversion function. According to a second aspect of the present disclosure, a corresponding fingerprint sensing method is conceived. According to a third aspect of the present disclosure, a corresponding computer program product is provided.

18 Claims, 6 Drawing Sheets

(56) References Cited

OTHER PUBLICATIONS van der Horn, G. et al. "Integrated Smart Sensors: Design and Calibration—Linearization based on a look-up table", The Springer International Series in Engineering and Computer Science, vol. 419, pp. 60-63 (1998).

Chen, SF et al. "Logarithmic CMOS Image Sensor Through Multi-Resolution Analog-To-Digital Conversion", IEEE 2003 International Symposium on VLSI Technology, Systems, and Applications, pp. 227-230 (2003).

Yamada, M. et al. "A Switched-Capacitor Interface for Capacitive Pressure Sensors", IEEE Transactions on Instrumentation and Measurement, vol. 41, No. 1, pp. 81-86 (1992).

Shimoyama, N. et al. "Evaluation of ESD Hardness for Fingerprint Sensor LSIs", IEEE Electrical Overstress/Electrostatic Discharge Symposium, 7 pgs. (2004).

Morimura, H. et al. "An Advanced Fingerprint Sensor LSI and its Application to a Fingerprint Identification System", Symposium VLSI Circuits Digest of Technical Papers, pp. 272-275 (2002).

Guilherme, J. et al. "Logarithmic Analogue-to-Digital Converters—Chapter 7", in: "CMOS Telecom Data Converters" Springer, 35 pgs. (2003).

Francesconi, F. et al. "A Low Power Logarithmic A/D Converter", IEEE International Symposium on Circuits and Systems, pp. 473-476 (1996).

Extended European Search Report for Patent Appln. No. 16177943.4 (dated Apr. 20, 2017).

* cited by examiner

| V | ADCcount |
|---|---|
| 0,025 | 0 |
| 0,050 | 3 |
| 0,100 | 5 |
| 0,200 | 7 |
| 0,300 | 9 |
| 0,400 | 10 |
| 0,500 | 11 |
| 0,600 | 11 |
| 0,700 | 12 |
| 0,800 | 12 |
| 0,900 | 13 |
| 1,000 | 13 |
| 1,100 | 13 |
| 1,200 | 14 |
| 1,300 | 14 |
| 1,400 | 14 |
| 1,500 | 15 |
| 1,600 | 15 |
| 1,700 | 15 |
| 1,800 | 15 |
| 1,900 | 15 |

| ADCcount | Z |
|---|---|
| 15 | 0 |
| 14 | 2 |
| 13 | 3 |
| 12 | 3 |
| 11 | 4 |
| 10 | 4 |
| 9 | 7 |
| 8 | 7 |
| 7 | 10 |
| 6 | 11 |
| 5 | 14 |
| 4 | 17 |
| 3 | 20 |
| 2 | 23 |
| 1 | 27 |
| 0 | 31 |

| V | ADCcount |
|---|---|
| 2,00 | 15 |
| 1,38 | 14 |
| 1,06 | 13 |
| 0,86 | 12 |
| 0,72 | 11 |
| 0,62 | 10 |
| 0,54 | 9 |
| 0,49 | 8 |
| 0,44 | 7 |
| 0,40 | 6 |
| 0,37 | 5 |
| 0,34 | 4 |
| 0,32 | 3 |
| 0,29 | 2 |
| 0,28 | 1 |
| 0,26 | 0 |

FIG. 11

FINGERPRINT SENSING SYSTEM AND METHOD

CROSS-REFERENCE TO RELATED APPLICATIONS

This application claims the priority under 35 U.S.C. § 119 of European patent application no. 16177943.4, filed on Jul. 5, 2016, the contents of which are incorporated by reference herein.

FIELD

The present disclosure relates to a fingerprint sensing system. Furthermore, the present disclosure relates to a corresponding fingerprint sensing method and to a corresponding computer program product.

BACKGROUND

Today, many electronic devices and systems require a form of user authentication. For example, in a payment system, a smart card may be used to initiate a payment and to authenticate a user. In addition to conventional user authentication via a personal identification number (PIN), a smart card may also include a fingerprint sensor for capturing the user's fingerprint. In that case, the captured fingerprint may be used to ascertain that the smart card is presented to a terminal by its rightful owner, for example. However, capturing a user's fingerprint with sufficient accuracy may be difficult.

SUMMARY

According to a first aspect of the present disclosure, a fingerprint sensing system is provided, comprising: a sensing unit configured to measure a physical property of a sensing cell and to produce a voltage in dependence on said physical property; and an analog-to-digital converter configured to convert said voltage into a digital signal, wherein said analog-to-digital converter implements a non-linear conversion function.

In one or more embodiments, the analog-to-digital converter implements a logarithmic conversion function.

In one or more embodiments, the logarithmic conversion function has a base of two.

In one or more embodiments, the system further comprises a post-conversion unit configured to produce, for a given value of the digital signal, an associated precomputed output value.

In one or more embodiments, the post-conversion unit is configured to use, for producing said precomputed output value, a look-up table comprising a plurality of digital signal values and associated precomputed output values.

In one or more embodiments, the look-up table is configurable by a host processor.

In one or more embodiments, the system further comprises a transformation unit configured to perform a fast Fourier transformation on output values produced by the post-conversion unit.

In one or more embodiments, the physical property represents the distance between a surface of the sensing cell and the surface of a finger.

In one or more embodiments, the physical property is an electrical capacitance.

In one or more embodiments, the analog-to-digital converter is a logarithmic pipelined analog-to-digital converter.

In one or more embodiments, the analog-to-digital converter is a flash analog-to-digital converter.

In one or more embodiments, the analog-to-digital converter has a reciprocal conversion characteristic.

In one or more embodiments, a smart card comprises a system of the kind set forth.

According to a second aspect of the present disclosure, a fingerprint sensing method is conceived, comprising: a sensing unit measures a physical property of a sensing cell and produces a voltage in dependence on said physical property; and an analog-to-digital converter that implements a non-linear conversion function converts said voltage into a digital signal.

According to a third aspect of the present disclosure, a computer program product is provided, the computer program product comprising non-transient instructions which, when executed by a processing unit, cause said processing unit to carry out or control a method of the kind set forth.

DESCRIPTION OF DRAWINGS

Embodiments will be described in more detail with reference to the appended drawings, in which.

DESCRIPTION OF EMBODIMENTS

Figure 1:
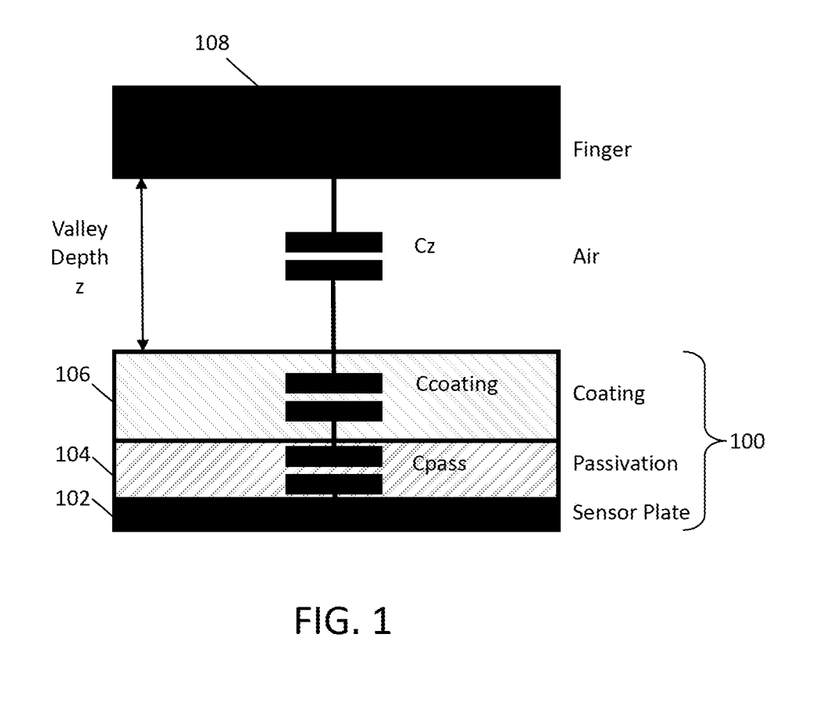
FIG. 1 shows an example of a sensing cell.

FIG. 1 shows an example of a sensing cell 100. The sensing cell 100 may form part of a fingerprint sensing system, which may for example be embedded in a smart card. Such a fingerprint sensing system may comprise a plurality of sensing cells, which may be arranged in the faun of a matrix, for example. Each sensing cell may have a physical property that may change in response to the proximity of an external object, for instance a human finger. In this example, the sensing cell 100 comprises a sensor plate 102, a passivation layer 104 and a coating 106. In this case, the physical property of the sensing cell is an electrical capacitance that may change in dependence on the distance between the upper surface of the sensing cell 100 and the surface of a human finger 108.

In particular, the sensor plate 102 is covered by a passivation layer 104 that may be made from silicon nitride. A protective scratch and wear protection in the form of a coating 106 is applied on the passivation layer 104. While the passivation layer 104 may have a thickness in the order of 1 µm to 3 µm, the typical thickness of the coating 106 is in the order of 25 µm to 50 µm. The valley depth z, i.e. the distance between the surface of the sensing cell 100 and the surface of the finger 108, is usually in the order of 25 µm. The passivation layer 104, the coating 106 and the valley may have different dielectric constants, named k-factors. The k-factor of the passivation layer 104 is in the order of 2-4, the k-factor of the coating 106 is in the order of 2-4 and the k-factor of the valley is the k-factor of air, which is 1. The total capacitance of the sensing cell, which may be measured by a sensing unit (not shown), may be expressed as $C_{meas}$.

$$C_{meas}=1/(1/C_{passivation}+1/C_{coating}+1/C_z)$$

The capacitance $C_{meas}$ is normally a non-linear function of the valley depth z, and vice versa, with the characteristic of a reciprocal function. A fingerprint sensing, system may use a measured capacitance $C_{meas}$ for determining the valley depth z between a particular cell and the finger. Accordingly, if measurements are taken from a plurality of sensing cells, a fingerprint's topology may be determined. Fingerprint sensors often utilize high-resolution linear analog-to-digital converters (ADCs) to generate a digital representation of the capacitance $C_{meas}$. High-resolution ADCs consume processing time, die area and power. Furthermore, fingerprint sensors often apply low-pass-filtering in combination with high resolution sampling (e.g. 508 dpi) to obtain images having sufficient quality for good fingerprint detection. One of the critical noise sources that degrades the signal-to-noise ratio is the quantization noise. The inventor has realized that, due to the nature of the measured capacitance $C_{meas}$, a linear ADC may not represent an optimal solution when low quantization noise is required. If the quantization noise can be reduced, even fingerprint sensors with a lower resolution (e.g. 250 dpi) may be used to provide a good three-dimensional resolution.

Typically, for small valley depths, the resolution is high in the sense that different valley depths yield capacitance values which can be sufficiently distinguished from each other, while for larger valley depths, the resolution is low in the sense that different valley depths yield capacitance values which cannot be distinguished well from each other. Therefore, a linearization of the measurement result may be required. However, a linearization of the measurement result may require time-consuming post-processing operations which consume valuable computational resources in a fingerprint authentication system. Furthermore, in resource-constrained systems, it may even be impossible to implement such a linearization. Therefore, it may be desirable to reduce the linearization effort in order to reduce the required computational resources and furthermore to reduce the integral power consumption of a fingerprint sensor and authentication system. Furthermore, it may be desirable to reduce the effort required for analog-to-digital conversion in terms of quantization, power, speed and die area consumption.

Therefore, in accordance with the present disclosure, a fingerprint sensing system is provided, comprising a sensing unit configured to measure a physical property of a sensing cell and to produce a voltage in dependence on said physical property, and an analog-to-digital converter configured to convert said voltage into a digital signal, wherein said analog-to-digital converter implements a non-linear conversion function. Furthermore, a corresponding fingerprint sensing method is conceived. In particular, the inventor has found that the use of an ADC having a non-linear conversion characteristic (i.e., implementing a non-linear conversion function) may reduce the amount of required computations, and thus the need for computational resources, while still enabling a linearization of the measurement result. In particular, the inventor has found that an ADC implementing a logarithmic conversion function may further reduce the amount of required computations while still enabling a linearization of the measurement result. In a practical and efficient implementation, the logarithmic conversion function has a base of two.

Figure 2:
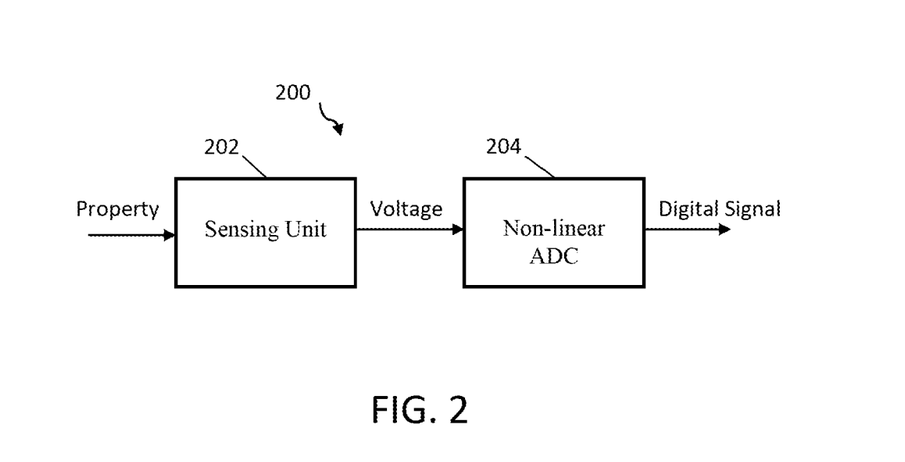
FIG. 2 shows an illustrative embodiment of a fingerprint sensing system.

FIG. 2 shows an illustrative embodiment of a fingerprint sensing system 200. The fingerprint sensing system 200 comprises a sensing unit 202 and a non-linear analog-to-digital converter 204 which are operatively coupled to each other. In operation, the sensing unit 202 measures a physical property, such as an electrical capacitance, from a sensing cell (not shown) and produces a voltage in dependence on the measured property. Furthermore, the non-linear analog-to-digital converter 204 converts the voltage into a digital signal.

Figure 3:
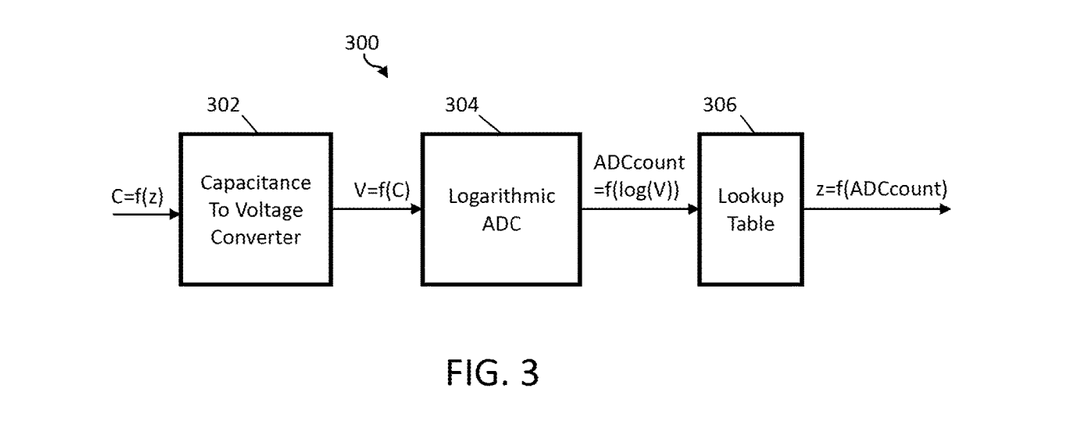
FIG. 3 shows another illustrative embodiment of a fingerprint sensing system.

FIG. 3 shows another illustrative embodiment of a fingerprint sensing system 300. In this example, the system 300 comprises a capacitance-to-voltage converter 302, a logarithmic analog-to-digital converter 304 operatively coupled to the capacitance-to-voltage converter 302, and a lookup table 306 operatively coupled to the logarithmic analog-to-digital converter 304. In operation, the capacitance-to-voltage converter 302 converts a measured capacitance, which may be regarded as a function of a valley depth z, into a voltage, which may thus be regarded as a function of the measured capacitance. The logarithmic analog-to-digital converter 304 converts the voltage into a digital signal, in particular a value $ADC_{count}$. The lookup table 306 takes the value $ADC_{count}$ as input and outputs a value z representing the measured valley depth.

Thus, in this embodiment, the system 300 comprises a post-conversion unit configured to produce, for a given value $ADC_{count}$ of the digital signal, an associated precomputed output value z. In particular, the post-conversion unit includes a lookup table 306 comprising a plurality of digital signal values and associated precomputed output values. In this way, calculation efforts may be further reduced and therefore less computational resources may be required. The inventor has found that the use of a logarithmic ADC 304 in combination with a lookup table 306 enables a particularly efficient implementation of the aforementioned linearization. Furthermore, in one or more embodiments, the look-up table 306 is configurable by a host processor. In this way, the fingerprint sensing system 300 may easily be tuned.

A more detailed example embodiment may be described as follows. As mentioned above, the measured capacitance comprises the following components:

$$C_{meas}=1/(1/C_{passivation}+1/C_{coating}+1/C_z)$$

wherein $C_z$ may represent the reciprocal valley depth z of the fingerprint topology. The passivation capacitance $C_{passivation}$ may be determined by the passivation thickness and its k-factor, wherein the k-factor is the material-specific dielectric constant. This capacitance is relatively large. The coating capacitance $C_{coating}$ may be determined by the coating thickness and its k-factor, resulting in a capacitance that has the same order of magnitude as the capacitance $C_z$.

Since both $C_{passivation}$ and $C_{coating}$ are defined during manufacturing of the fingerprint sensor these capacitances may be assumed as being constant within one fingerprint image scan, having the capacitance $C_{const}$, expressed by its inverse value a as:

$$a=1/C_{const}$$

The measured capacitance $C_{meas}$ may now be defined as:

$$C_{meas}=1/(a+1/C_z)$$

The voltage $V_{cap}$ provided by the capacitance-to-voltage converter 302 may be regarded as linearly dependent on $C_{meas}$ with c being the conversion factor:

$$V_{cap}=c*C_{meas}$$

Furthermore, the air gap or valley depth capacitance Cz may be defined as:

$$C_z=k0*k*\text{area}*1/z,$$

wherein k0 is the permittivity of vacuum, k is the k-factor of air which is 1, area is the area defined by the width and the length of the sensor plate and z is the valley depth (i.e. the distance between the upper surface of the sensor cell and the surface of the finger) to be measured.

$C_{meas}$ may now be expressed as a function of z:

$$C_{meas}=1/(a+z/b)$$

$$V_{cap}=c/(a+z/b),$$

wherein b=k0*k area. Thus:

$$V_{cap}=b*c/(a*b+z)$$

The measured valley depth z may now be obtained as follows:

$$b*c/V_{cap}=a*b+z$$

$$z=b*c/V_{cap}-a*b$$

$$z=b*(c/V_{cap}-a)$$

In accordance with the present disclosure the term $(c/V_{cap})$ may be evaluated in the logarithmic domain:

$$\log(c/V_{cap})=-\log(V_{cap}/c)$$

In case a logarithm with a base of 2 is used 1/x in the log(2) domain may be expressed as:

$$-\text{ld}(V_{cap}/c),$$

wherein ld represents the logarithm with base 2 (logarithmus dualis).

This yields for z:

$$z=2^{[\text{ld}(b)-\text{ld}(V_{cap}/c)]}-a*b$$

In a practical and efficient implementation, the value of 1/c may be pre-calculated in order to substitute division by multiplication. An ADC with logarithmic conversion function may now be applied which may combine sampling and logarithmization in one step.

In some embodiments the logarithmization may be implemented as:

$$ADC_{count}=\text{ld}(V_{cap}/c)$$

Figure 4:
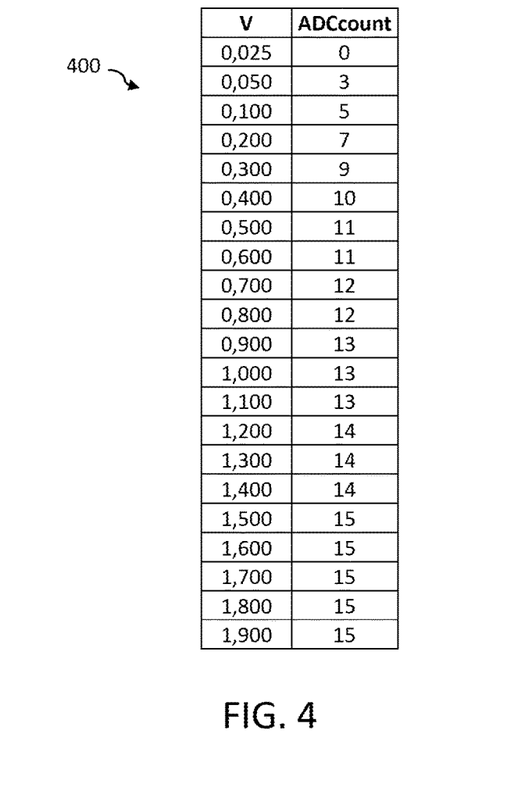
FIG. 4 shows an illustrative embodiment of a conversion function of an analog-to-digital converter.

FIG. 4 shows an illustrative embodiment of a non-linear conversion function 400 of an analog-to-digital converter. That is to say, in the particular example described here, the ADC conversion function may be defined by the values shown in the table depicted in FIG. 4. It is noted that ld (b) is a constant and maybe set to ld (b)=A.

This may yield:

$$z=2^{(A-ADC_{count})}-b$$

This power of 2 exponentiation may be realized by a shift-left operation:

$$z=[1SHL(A-ADC_{count})]-b,$$

wherein SHL may be a barrel-shift left operation to implement the required exponentiation.

Figure 5:
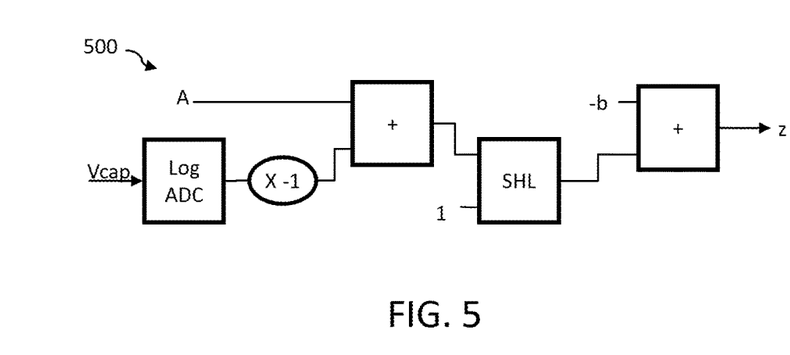
FIG. 5 shows an illustrative embodiment of a linearization function implementation.

FIG. 5 shows an illustrative embodiment of a linearization function implementation 500. The implementation comprises the aforementioned barrel-shift left operation SHL.

Figure 6:
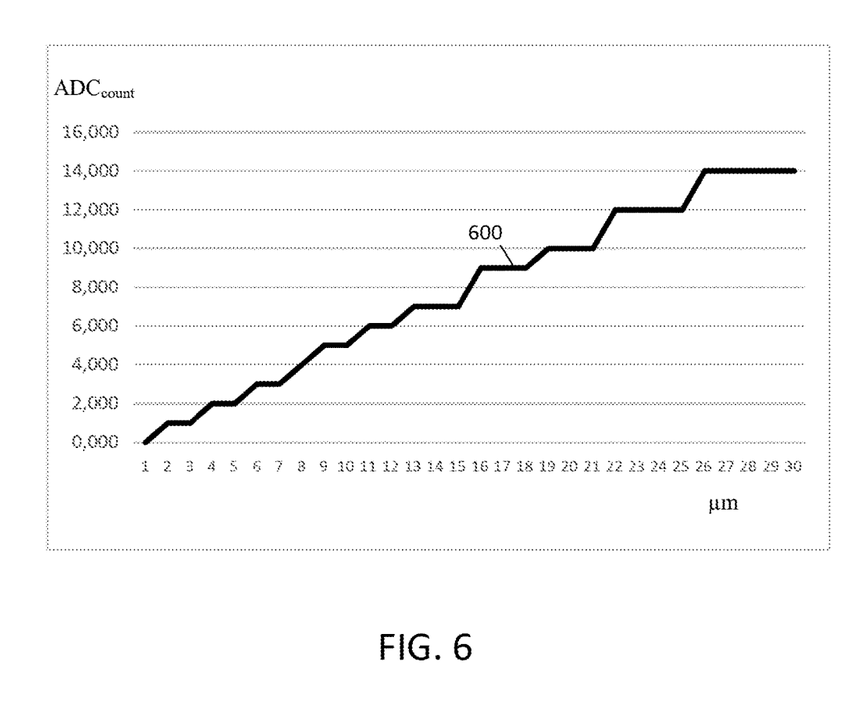
FIG. 6 shows an output of an analog-to-digital converter as a function of the valley depth.

FIG. 6 shows an output of an analog-to-digital converter as a function 600 of the real valley depth z. In particular, it shows an example of the conversion of the sensor plate gap (i.e., the real valley depth) to its related digital value (i.e., the value $ADC_{count}$). The x-axis represents the sensor plate gap in μm, the y-axis shows the obtained measurement value $ADC_{count}$, in this example with an applied attenuation factor that may provide an option to store the value in a 4-bit variable. Using 4-bit variables may enable packing two 4-bit variables into one data byte which may reduce bandwidth requirements for data transfer to a host processor. Since the data transfer to the host processor is often a bottleneck in image capture time, this may also increase the image capture rate. Due to cut-off effects resulting from integer conversion in the logarithmic domain deviations from an ideal conversion may occur in the sensor plate distance readings. However, due to the nature of fingerprint image processing the impact of these deviations is neglectable.

Figure 7:
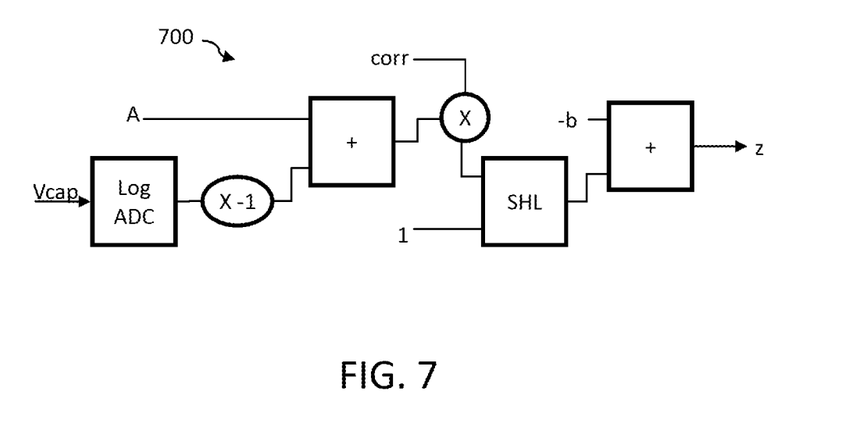
FIG. 7 shows another illustrative embodiment of a linearization function implementation.

FIG. 7 shows another illustrative embodiment of a linearization function implementation 700. In particular, it shows a linearization function implementation in which an adjustment factor is used, which may be useful if the logarithmic conversion has a base different from two. That is to say, in some embodiments logarithmization may be implemented on a base that is different from 2, which may give a finer sampling resolution. Since de-logarithmization in the binary domain may easily be achieved for a logarithm base of 2, the value provided by the logarithmic ADC may be adjusted to a base of 2 by applying an adjustment factor corr. The adjustment factor may be calculated as follows:

$$\log(x)\text{base}=\text{ld}(x)/\text{ld}(\text{base}),$$

wherein ld( ) is the logarithm with base 2. Then:

$$\text{ld}(x)=\text{ld}(x)\text{base}*\text{corr}$$

$$\text{corr}=\text{ld}(\text{base})$$

The adjustment factor corr is a constant that may be pre-calculated. It is useful to choose the logarithm base such that corr may result in a value that supports easy integer calculations. The valley depth z may now be obtained as follows:

$$z=[1SHL(A-ADC_{count}*\text{corr})]-b$$

The resulting conversion steps are illustrated in Fig. In some embodiments pre-calculated products "$ADC_{count}$*corr" may be stored in a table that holds for every discrete $ADC_{count}$ one product term. This approach avoids implementation of a hardware multiplier and simplifies the multiplication to a table-lookup which is fast and does not consume resources. For a 16-step logarithmization 15 memory locations are required (an ADC value of 0 will provide 0):

$$z=[1SHL(A-\text{lookup}(ADC_{count}))]-b,$$

wherein SHL is a shift-left function.

Referring back to FIG. 3, in some embodiments fully pre-calculated terms "[1 SHL(A−$ADC_{count}$*corr)]−b" may be stored in the look-up table 306, which in that case may hold for every discrete $ADC_{count}$ one z-term that directly translates $ADC_{count}$ into the measured valley depth z. This approach simplifies the calculation of z:

$$z=\text{lookup}(ADC_{count})$$

In this way, an efficient and fast way of obtaining the measured valley depth z from the logarithmic ADC reading is provided, without a need for a hardware multiplier or a barrel shifter and furthermore utilizing the fact that z is solely a function of $ADC_{count}$. This approach is feasible because the discrete output of the logarithmic ADC has a limited definition space of [0, 1 . . . samples]. For 32 discrete output values, for example, 31 terms need to be stored. If every term is represented by a 4-bit value two of these values may be packed into one byte, thereby reducing the required table to 16 bytes in the given example.

Figure 8:
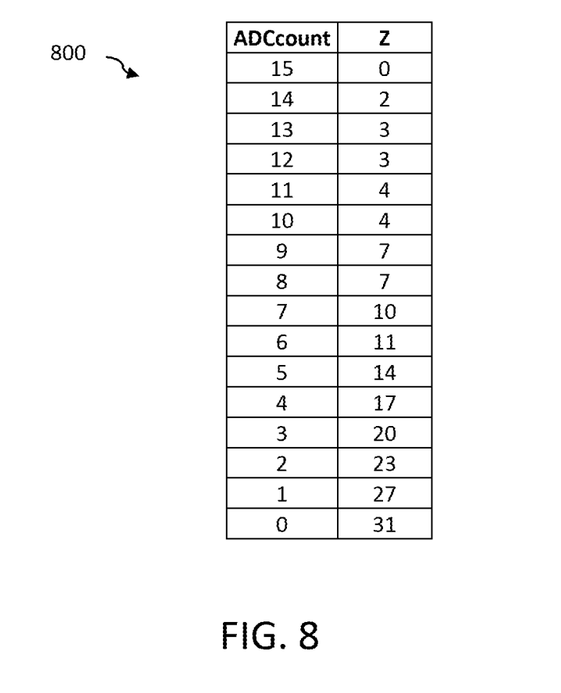
FIG. 8 shows an illustrative embodiment of a lookup table.

FIG. 8 shows an illustrative embodiment of a lookup table 800. As described with reference to FIG. 7 above, the look-up table 800 comprises for every discrete $ADC_{count}$ one z-term that directly translates $ADC_{count}$ into the measured valley depth z. In this way, the calculation of the measured valley depth z is simplified.

Figure 9:
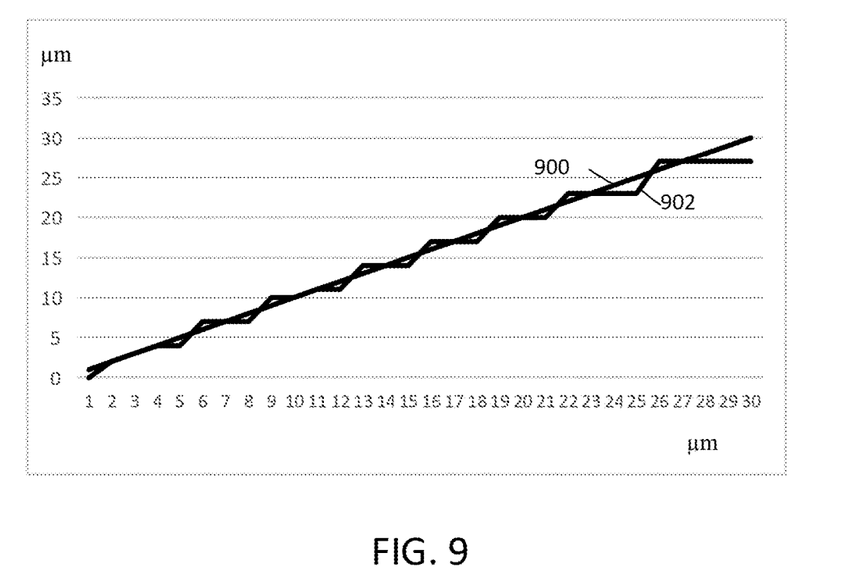
FIG. 9 shows an example of how the real valley depth differs from a measured valley depth.

FIG. 9 shows an example of how the real valley depth differs from a measured valley depth. In particular, it shows on the x-axis the real valley depth in μm, and on the y-axis the measured valley depth in μm. Reference line 900 shows an exact correspondence between the real valley depth and the measured valley depth. That is to say, reference line 900 shows the measurement result of an ideal fingerprint sensing system. Line 902 shows the measured valley depth as a function of the real valley depth. Here, the output is illustrated of a fingerprint sensing system implemented in accordance with the above-described embodiments. It can be seen that the output represented by line 902 is fairly linear. Thus, the output is relatively accurate while the need for computational resources is not too high. Furthermore, noise clipping has been applied for valley depths greater than 26 μm.

Figure 10:
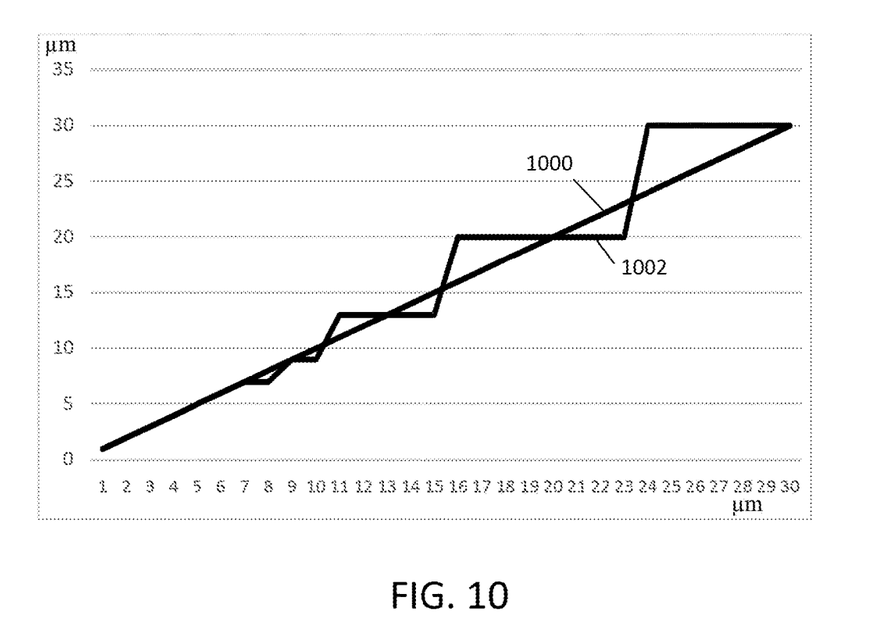
FIG. 10 shows another example of how the real valley depth differs from a measured valley depth.

FIG. 10 shows another example of how the real valley depth differs from a measured valley depth. Again, it shows on the x-axis the real valley depth in μm, and on the y-axis the measured valley depth in μm. Reference line 1000 shows an exact correspondence between the real valley depth and the measured valley depth. That is to say, reference line 1000 shows the measurement result of an ideal fingerprint sensing system. Line 1002 shows the measured valley depth as a function of the real valley depth. In this example, line 1002 represents the output of a fingerprint sensing system comprising a linear ADC. It can be seen that, in comparison to the output illustrated in FIG. 9, the output represented by line 1002 deviates significantly from the ideal output represented by reference line 1000. In particular for large valley depths the output is not sufficiently accurate.

In some embodiments the look-up table as shown in FIG. 8 may be stored in a volatile memory, such as a RAM, which enables installation of table data by a host processor. This approach may enable the host processor to adjust the look-up table according to application needs in real-time. Furthermore, in some embodiments the logarithm base may be calculated in dependence on the signal-to-noise ratio of the capacitance-to-voltage convertor 302 of the fingerprint sensing cell. In particular, for a given input voltage range $V_{range}$ and an S/N-ratio the noise level may be calculated as follows:

$$V_{noise}=V_{range}/S/N$$

The logarithm base may be calculated from the S/N ratio and the number of samples as follows:

$$base=S/N^{(1/samples)}$$

As an example, for a conversion voltage range of 2V, an S/N of 100 (40 dB) and 16 steps the logarithm base may be:

$$base=100^{(1/16)}=1.333521 \ldots$$

In some embodiments a fast Fourier transformation (FFT) is applied to the samples provided by the look-up table. The look-up table may be configured to provide output values that are powers of 2 which may simplify a consecutive FFT calculation because many coefficients may become 0. This may speed up the FFT calculation and hence save calculation resources and may reduce the power consumption. In some embodiments a logarithmic pipelined ADC may be utilized. The logarithmic conversion principle may simplify the ADC design because fewer subtractions are required compared to a linear ADC. In some embodiments a flash ADC may be utilized. In this configuration 15 comparators may be required for a 16 step logarithmic ADC. A switched capacitor voltage divider may be utilized to provide the reference voltage levels by charge division, thus making sure that non-integer factors are applied such that a monotonous conversion characteristic is achieved. In some embodiments hi-k material with a k-factor of 8 to 18 and above is used for the coating material in order to compensate for the coating thickness, thereby increasing the sensitivity of the sensor.

Figure 11:
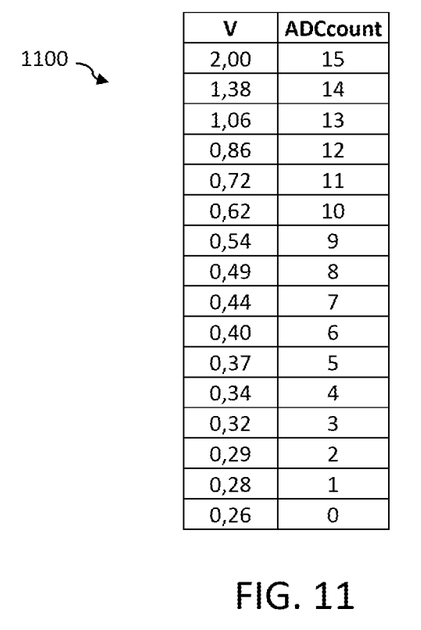
FIG. 11 shows another illustrative embodiment of a conversion function of an analog-to-digital converter.

FIG. 11 shows another illustrative embodiment of a conversion function 1100 of an analog-to-digital converter. In particular, it shows a conversion function 1100 of an ADC with a reciprocal conversion characteristic. In some embodiments the ADC may be an ADC with reciprocal conversion characteristic, followed by post-conversion unit including a lookup table for deriving z from the ADC reading $ADC_{count}$. The reciprocal conversion characteristic may provide minimal quantization noise and may provide a direct linear representation of the sensor plate distance. The quantization noise is now solely determined by the variation of the comparator reference levels in the ADC. Reference level adjustment by trimming during manufacturing may be applied to minimize this sort of noise. The conversion characteristic of the ADC may be defined as:

$$z=a-1/V_{cap}*b+c$$

With a=16 for 16 quantization levels this may result in an accurate output. The reciprocal ADC conversion characteristic may be best implemented by a flash ADC with fixed reference levels for the individual quantization levels. An example of an ADC conversion characteristic with a conversion range of 2V is shown in FIG. 11. It is a characteristic of reciprocal ADCs that the comparator resolution may increase towards lower input voltages. This also means that the comparator gain may be increased towards lower input voltages, so that power may be saved for larger input voltages.

In some embodiments the conversion function is made adjustable during production by means of, for example, laser trimming, flash programming or other suitable methods. In some embodiments the comparator gain is adapted to the input voltage level by adapting its bias/supply current. Furthermore, in some embodiments the non-linear conversion results may be provided to a micro-processing unit for applying the linearization calculation steps. This may be useful if a coarse scan at reduced quantization is required for time and power saving purposes.

The systems and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 sensing cell
102 sensor plate
104 passivation layer
106 coating
108 finger
200 fingerprint sensing system
202 sensing unit
204 non-linear analog-to-digital converter
300 fingerprint sensing system
302 capacitance-to-voltage converter
304 logarithmic analog-to-digital converter
306 lookup table
400 conversion function of analog-to-digital converter
500 implementation of linearization function
600 ADC output as function of valley depth
700 implementation of linearization function
800 lookup table
900 reference line
902 measured valley depth as function of real valley depth
1000 reference line
1002 measured valley depth as function of real valley depth
1100 conversion function of analog-to-digital converter

The invention claimed is:

1. A fingerprint sensing system, comprising:
   a capacitance-to-voltage converter configured to measure a capacitance from a fingerprint sensing cell and to produce a voltage in dependence on said capacitance from the fingerprint;
   an analog-to-digital converter configured to convert said voltage into a digital signal, wherein said analog-to-digital converter implements a non-linear conversion function; and
   a look-up table used to convert the digital signal to a value representing a measured valley depth of the fingerprint.

2. The system of claim 1, wherein the analog-to-digital converter implements a logarithmic conversion function.

3. The system of claim 2, wherein the logarithmic conversion function has a base of two.

4. The system of claim 2, wherein the logarithmic conversion function has a base calculated in dependence on a signal-to-noise ratio of the capacitance-to-voltage converter.

5. The system of claim 4, wherein the look-up table provides a de-logarithmization of the logarithmic conversion function.

6. The system of claim 5, wherein the look-up table is configurable by a host processor.

7. The system of claim 4, further comprising a transformation unit configured to perform a fast Fourier transformation on output values provided by the look-up table.

8. The system of claim 1, wherein the valley depth represents the distance between a surface of the sensing cell and the surface of a finger.

9. The system of claim 1, wherein the look-up is configured to provide values that are powers of 2.

10. The system of claim 1, wherein the analog-to-digital converter is a logarithmic pipelined analog-to-digital converter.

11. The system of claim 1, wherein the analog-to-digital converter is a flash analog-to-digital converter.

12. The system of claim 1, wherein the analog-to-digital converter has a reciprocal conversion characteristic.

13. A smart card comprising the fingerprint sensing system of claim 1.

14. A fingerprint sensing method, comprising:
using a capacitance-to-voltage converter to measure a capacitance from the fingerprint sensing cell to produce a voltage in dependence on said physical property;
providing an analog-to-digital converter that implements a logarithmic conversion function to convert said voltage into a digital signal; and
using a look-up table to convert the digital signal to a value representing a linearization of the logarithmic conversion function to provide a measurement of a valley depth of the fingerprint.

15. A non-transitory computer program product comprising instructions which, when executed by a processing unit, cause said processing unit to carry out or control the method of claim 14.

16. The method of claim 14, wherein the logarithmic conversion function has a base of two.

17. The method of claim 14, further comprising performing a fast Fourier transformation of the value provided by the look-up table.

18. The method of claim 14, further comprising configuring the look-up table using a host processor.

* * * * *